(12) United States Patent
Qiu (10) Patent No.: US 10,237,271 B2
(45) Date of Patent: Mar. 19, 2019

(54) ACCESS TERMINAL

(71) Applicant: HEWLETT PACKARD ENTERPRISE DEVELOPMENT LP, Houston, TX (US)

(72) Inventor: Chunxia Qiu, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 57 days.

(21) Appl. No.: 14/892,907

(22) PCT Filed: Apr. 3, 2014

(86) PCT No.: PCT/CN2014/074683
§ 371 (c)(1),
(2) Date: Nov. 20, 2015

(87) PCT Pub. No.: WO2015/000313
PCT Pub. Date: Jan. 8, 2015

(65) Prior Publication Data
US 2016/0308864 A1    Oct. 20, 2016

(30) Foreign Application Priority Data
Jul. 3, 2013    (CN) .......................... 2013 1 0278636

(51) Int. Cl.
*H04L 9/00*   (2006.01)
*H04L 29/06*  (2006.01)

(52) U.S. Cl.
CPC ...... *H04L 63/0876* (2013.01); *H04L 63/0861* (2013.01); *H04L 63/145* (2013.01)

(58) Field of Classification Search
CPC .................................................. H04L 63/0876
USPC ............................................................ 726/5
See application file for complete search history.

(56) References Cited

U.S. PATENT DOCUMENTS

| | | | |
|---|---|---|---|
| 7,206,610 B2 | 4/2007 | Iacono et al. | |
| 7,627,123 B2* | 12/2009 | Conway | H04L 63/02 380/247 |
| 8,533,461 B2 | 9/2013 | Liu et al. | |
| 9,436,820 B1* | 9/2016 | Gleichauf | G06F 21/50 |

(Continued)

FOREIGN PATENT DOCUMENTS

| | | |
|---|---|---|
| CN | 1753364 C | 3/2006 |
| CN | 101437048 | 5/2009 |

(Continued)

OTHER PUBLICATIONS

"BlueCat Networks Adds Pre-Admission Network Access Control to Latest Release of Adonis DNS/DHCP Appliance", BlueCat Networks, Feb. 15, 2006.

(Continued)

*Primary Examiner* — Christopher J Brown
(74) *Attorney, Agent, or Firm* — Hewlett Packard Enterprise Patent Department (57) ABSTRACT

A network access device may obtain user fingerprint information of a terminal. The network access device may transmit the user fingerprint information of the terminal to a portal server, before the terminal is authenticated, so that the portal server may push to the terminal an authentication page corresponding to the user fingerprint information of the terminal.

20 Claims, 7 Drawing Sheets

---

```
┌─────────────────────────────────────────────────────────────┐
│ a network access device may obtain user fingerprint         │
│ information of a terminal                                    │
└─────────────────────────────────────────────────────────────┘
                              │ 101
                              ▼ 102
┌─────────────────────────────────────────────────────────────┐
│ before the terminal is authenticated, the network access    │
│ device may transmit the user fingerprint information of     │
│ the terminal to a portal server, such that the portal       │
│ server may push to the terminal an authentication page      │
│ corresponding to the user fingerprint information of the    │
│ terminal                                                    │
└─────────────────────────────────────────────────────────────┘
```

(56) References Cited

U.S. PATENT DOCUMENTS

| | | | |
|---|---|---|---|
| 2002/0107961 A1* | 8/2002 | Kinoshita | H04L 63/0272 709/225 |
| 2002/0112150 A1* | 8/2002 | Lawing | H04L 41/044 713/1 |
| 2004/0003081 A1* | 1/2004 | Justus | H04L 63/0815 709/225 |
| 2009/0183247 A1 | 7/2009 | Kasper et al. | |
| 2014/0122395 A1* | 5/2014 | Nahum | H04L 41/0886 706/13 |
| 2015/0237527 A1* | 8/2015 | Knutson | H04W 28/0289 726/4 |

FOREIGN PATENT DOCUMENTS

| | | |
|---|---|---|
| CN | 101656725 | 2/2010 |
| CN | 102204307 B | 9/2011 |
| CN | 102238543 | 11/2011 |
| WO | WO-2010031263 | 3/2010 |
| WO | WO-2012141494 | 10/2012 |
| WO | WO-2013023470 | 2/2013 |

OTHER PUBLICATIONS

"FortiOS Handbook What's New for FortiOS 5.0", Fortinet Technologies Inc., Aug. 21, 2013.

"Understanding the Default Action of Pre-authentication Scan of Access Gateway Enterprise Edition", Citrix Systems, Inc. Mar. 4, 2008. http://support.citrix.com/static/oldkc/CTX116248.html.

"Wireless BYOD with Identity Services Engine", Cisco Systems Inc., May 13, 2012.

International Search Report and Written Opinion dated Jul. 2, 2014, PCT Patent Application No. PCT/CN2014/074683 dated Apr. 3, 2014, The State Intellectual Property Office, P.R. China.

Coffeen, T., "DHCPv6 Fingerprinting and BYOD", Infobiox Control Your Network, XP-002765937, Apr. 8, 2013 (Apr. 8, 2013), 41 pages.

Colin, J.., "COTD: DHCP Fingerprinting how-to (ArubaOS 6.0.1.0 and above)", cjoseph AIRHEADS, Guru Elite, Apr. 23, 2011 (Apr. 23, 2011), XP002765938, 6 pages.

Hull, D. et al., "Next Generation DHCP Deployments", Security, XP-002765921, Feb. 1, 2005 (Feb. 1, 2005), pp. 28-33.

\* cited by examiner

ACCESS TERMINAL

CLAIM FOR PRIORITY

The present application is a national stage filing under 35 U.S.C. § 371 of PCT application number PCT/CN2014/074683, having an international filing date of Apr. 3, 2014, which claims priority to Chinese patent application number 201310278636.8, having a filing date of Jul. 3, 2013, the disclosures of which are hereby incorporated by reference in their entireties.

BACKGROUND

With the popularity of smart phones and tablet computers, which are represented by iPhone, iPad, and Android, bring your own device (BYOD) gradually comes into view. More and more employees may bring their own terminal devices to work in office, which may not only facilitate the employees' choices, but also enable enterprises to save a lot of fixed investments on office computers.

DETAILED DESCRIPTIONS

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

An enterprise may allow employees or visitors to carry their terminal devices to access a corporate network. Subsequently, the corporate network needs to intelligently identify types of these terminal devices, whether these terminal devices are assets of the company, and give different authorities to these terminal devices.

Figure 1:
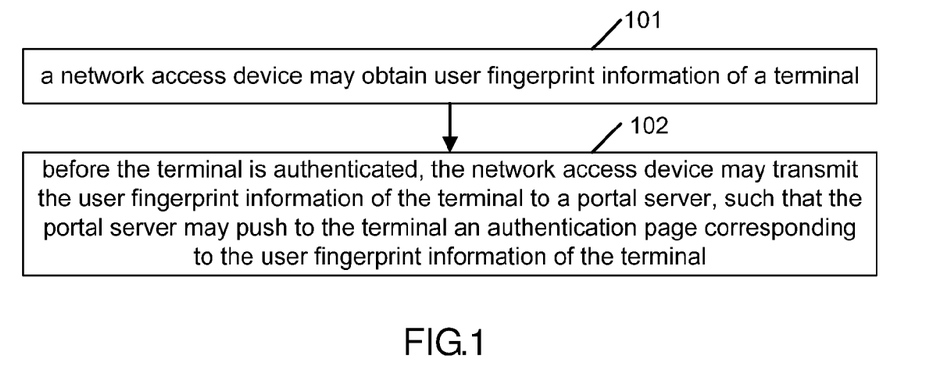
FIG. 1 is a flowchart illustrating a method, in accordance with an example of the present disclosure.

With reference to FIG. 1, FIG. 1 is a flowchart illustrating a method, in accordance with an example of the present disclosure. As shown in FIG. 1, the flow may include the following blocks.

In block 101, a network access device may obtain user fingerprint information of a terminal.

In block 102, before the terminal is authenticated, the network access device may transmit the user fingerprint information of the terminal to a portal server, so that the portal server may push to the terminal an authentication page corresponding to the user fingerprint information of the terminal.

Until now, the flow illustrated with FIG. 1 may be completed.

Based on the flow illustrated with FIG. 1, it can be seen that, in the present disclosure, when assigning authorities for terminals carried by employees or visitors, it is not necessary to install the DHCP agent plug-in, which is configured to transmit the user fingerprint information of the terminal to the portal server, on the DHCP server. Instead, before the terminal is authenticated, the network access device may actively transmit the user fingerprint information of the terminal to the portal server, so that the portal server may push to the terminal the authentication page corresponding to the user fingerprint information of the terminal.

The method illustrated with FIG. 1 of the present disclosure will be described in the following with two examples.

An example may be as follows.

When receiving an HTTP request, which is transmitted by a terminal before being authenticated, a portal server may transmit an information request packet to a network access device. The network access device may search for user fingerprint information of the terminal, based on the IP address of the terminal carried in the information request packet, and transmit the user fingerprint information of the terminal to the portal server by using an information response packet. The 'user fingerprint information" is information which identifies the terminal or terminal user. In one example the user fingerprint information may be a MAC address of the terminal, Option 55 data information of the terminal, HTTP agent information or any combination thereof.

In one example the information request packet may be a packet complying with the portal protocol, which is originally configured to search for user physical information of the terminal, and may be a request-information (REQ-INFO) packet. Correspondingly, the information response packet may be a packet complying with the portal protocol, which is originally configured to respond to the user physical information of the terminal. When the information request packet is the REQ-INFO packet, the information response packet may be an acknowledgement-information (ACK-INFO) packet.

That is to say, in the example, for the REQ-INFO packet, which originally requests to search for the user physical information of the terminal, enable the REQ-INFO packet not only to request the user physical information of the terminal, but also request the user fingerprint information of the terminal on the basis of requesting the user physical information of the terminal. Similarly, in the example, the ACK-INFO packet in response to the user physical information of the terminal may also be improved, so that the ACK-INFO packet may not only carry the user physical information of the terminal, but also carry the user fingerprint information of the terminal on the basis of carrying the user physical information of the terminal.

In the example, the information request packet and the information response packet may be packets complying with the portal protocol format, which may be newly created in the present disclosure.

The method provided in the example may be further described in the following with an example, in which the information request packet is the REQ-INFO packet, and the information response packet is the ACK-INFO packet.

Figure 2:
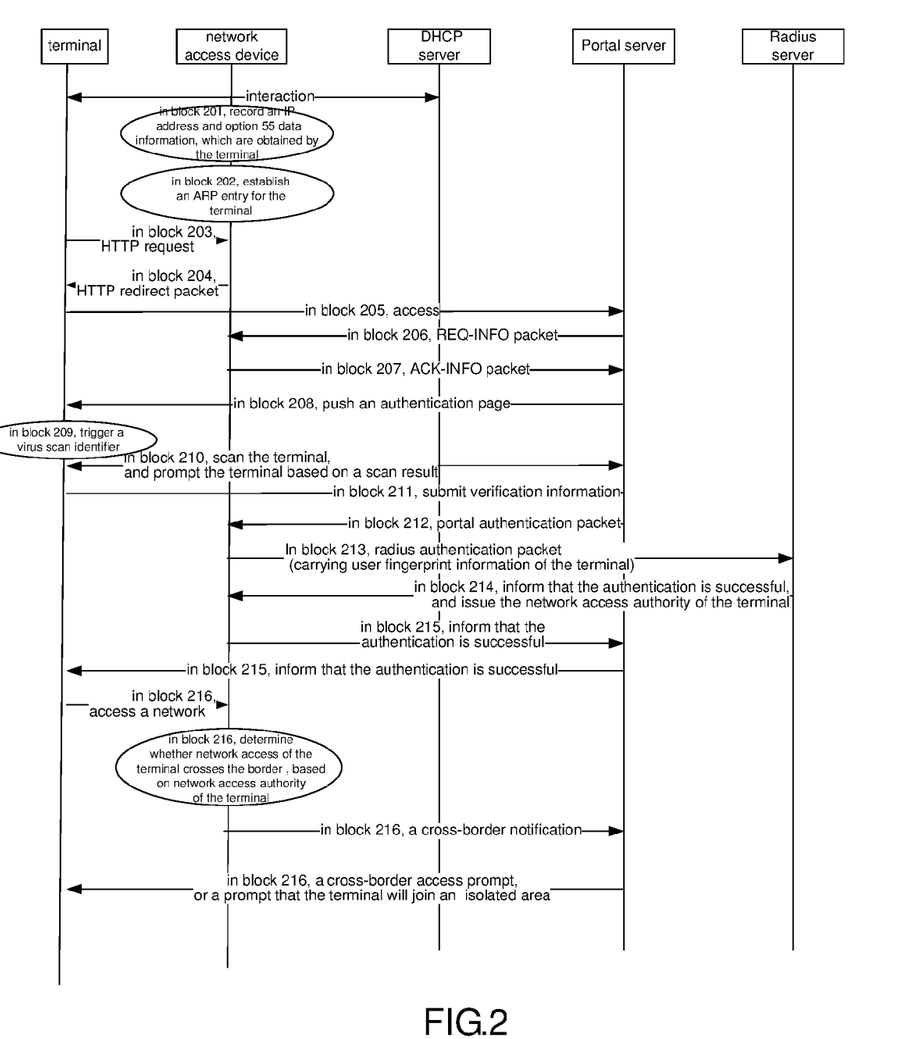
FIG. 2 is a flowchart illustrating a method, in accordance with an example of the present disclosure.

With reference to FIG. 2, FIG. 2 is a flowchart illustrating a method, in accordance with an example of the present disclosure. In the flow shown in FIG. 2, the user fingerprint information of the terminal may include the MAC address and Option 55 data information of the terminal. The terminal identifier may be the IP address of the terminal.

As shown in FIG. 2, the flow may include the following blocks.

In block 201, during interaction process between a terminal and a DHCP server, a network access device may record an IP address and Option 55 data information obtained by the terminal.

In block 202, the network access device may establish an address resolution protocol (ARP) entry for the terminal. The ARP entry may include at least the IP address and MAC address of the terminal.

In block 203, the terminal may transmit an HTTP request before being authenticated.

In block 204, the network access device may receive the HTTP request from the terminal, and return an HTTP redirect packet carrying a uniform resource locator (URL) to the terminal.

Here, the URL carried by the HTTP redirect packet may be website of a portal server.

In block 205, the terminal may access the portal server, based on the URL carried by the HTTP redirect packet received.

In block 206, when the terminal accesses the portal server, the portal server may transmit a REQ-INFO packet to the network access device.

The REQ-INFO packet may carry the IP address of the terminal.

In block 207, the network access device may receive the REQ-INFO packet, search for the MAC address of the terminal in ARP entries established by the network access device, based on the IP address carried by the REQ-INFO packet, search for the Option 55 data information of the terminal in Option 55 data information recorded by the network access device, based on the IP address carried by the REQ-INFO packet, enable the MAC address and Option 55 data information of the terminal searched to form the user fingerprint information of the terminal, enable the ACK-INFO packet to carry the user fingerprint information of the terminal, and transmit the ACK-INFO packet to the portal server.

In block 208, the portal server may push to the terminal an authentication page corresponding to the user fingerprint information of the terminal, based on the user fingerprint information of the terminal carried by the ACK-INFO packet.

Specifically speaking, the portal server may determine type of the terminal based on the user fingerprint information of the terminal. When determining that the terminal is a terminal of a visitor, the portal server may push an authentication page corresponding to the visitor. When determining that the terminal is a terminal of an employee, the portal server may push an authentication page corresponding to an enterprise terminal. Generally speaking, the authentication page corresponding to the visitor terminal may be different from the authentication page corresponding to the enterprise terminal.

As an example of the present disclosure, to ensure that the terminal is safe, when the terminal accesses the network, a virus scan may be firstly executed for the terminal in the present disclosure, before the terminal accesses the network. After determining that the terminal is safe, the authentication may be executed for the terminal.

To implement that the virus scan is firstly executed for the terminal before the terminal accesses the network, in the present disclosure, the portal server may embed a virus scan identifier on the authentication page, when pushing the authentication page to the terminal. And then, the scan of the terminal may be executed by enabling the terminal to trigger the virus scan identifier, which may refer to blocks 209 to 210. The virus scan identifier on the authentication page may exist in the manner of button or input box, which is not limited by the present disclosure.

In block 209, the terminal may trigger the virus scan identifier on the authentication page received.

In block 210, when receiving the triggering of the virus scan identifier from the terminal, the portal server may initiate the scan of the terminal. When determining that the terminal is safe after scanning, the portal server may allow the terminal to input verification information to be authenticated. When determining that the terminal is not safe after scanning, e.g., the terminal has been infected with a virus, the portal server may prompt the terminal to kill virus. The portal server may allow the terminal to input the verification information to be authenticated, when virus killing is completed.

In the present disclosure, block 210 may be implemented with the following two modes.

A mode may be as follows.

When receiving the triggering of the virus scan identifier from the terminal, the portal server may trigger antivirus software installed by the terminal to scan the terminal.

The terminal may transmit a scan result to the portal server, after the scan is completed.

The portal server may receive the scan result transmitted by the terminal, after the scan is completed. When the scan result shows that the terminal is not safe, the portal server may prompt the terminal to kill virus. When the virus killing is completed, the portal server may allow the terminal to input the verification information to be authenticated. When the scan result shows that the terminal is safe, the portal server may allow the terminal to input the verification information to be authenticated.

That is, in the foregoing mode, the terminal may be scanned by using the antivirus software installed on the terminal, when being triggered by the portal server.

Another mode may be as follows.

When receiving the triggering of the virus scan identifier from the terminal, the portal server may remotely control the antivirus software installed on the portal server to scan the terminal. When determining that the terminal is not safe after the scan is completed, the portal server may prompt the terminal to kill virus. The portal server may allow the terminal to input verification information to be authenticated, when the virus killing is completed. When determining that the terminal is safe, the portal server may allow the terminal to input the verification information to be authenticated.

That is, in the mode, the portal server may perform the remote scan on the terminal, by using the antivirus software installed on the portal server.

In the foregoing two modes, the verification information inputted by the terminal may be user account and password.

In block 211, when being allowed to input the verification information, the terminal may input the verification information on the authentication page, and submit to the portal server.

In block 212, the portal server may encapsulate the verification information with portal protocol into a portal authentication packet, and transmit the portal authentication packet to the network access device.

In block 213, the network access device may enable a RADIUS authentication packet to carry the user fingerprint information of the terminal and the verification information carried by the portal authentication packet, and transmit the RADIUS authentication packet to a RADIUS server.

In block 214, the RADIUS server may authenticate the verification information carried by the RADIUS authentication packet. When the verification information passes the authentication, the RADIUS server may inform the network access device that the terminal authentication is successful, and issue network access authority of the terminal, based on the user fingerprint information of the terminal carried by the RADIUS authentication packet.

Specifically speaking, the RADIUS server may determine type of the terminal, based on the user fingerprint information of the terminal. When determining that the terminal is a terminal of a visitor, the RADIUS server may issue a network access authority defined for the visitors. When determining that the terminal is a terminal of an employee, the RADIUS server may issue a network access authority defined for enterprise terminals. The network access authority defined for visitors may be generally different from the network access authority defined for enterprise terminals.

In block 215, the network access device may receive and store the network access authority of the terminal, and inform the portal server that the terminal authentication is successful. Then, the portal server may inform the terminal that the terminal authentication is successful.

In block 216, the terminal may access the network. The network access device may determine whether network access of the terminal crosses the border, based on the network access authority of the terminal. When determining that the network access of the terminal crosses the border, the network access device may inform the portal server that the terminal access crosses the border. Then, the portal server may provide a cross-border access prompt for the terminal, or provide a prompt that the terminal will join an isolated area for the terminal.

As an example of the present disclosure, the foregoing block 216 may further include the follows.

The network access device may further inform the RADIUS server to re-issue the network access authority defined for the terminal.

The RADIUS server may re-issue the network access authority defined for the terminal.

The network access device may receive and store the network access authority defined for the terminal, which is re-issued by the RADIUS server, and remove previously stored network access authority defined for the terminal, so that the network access device may store the latest network access authority of the terminal issued by the RADIUS server.

Until now, the flow illustrated with FIG. 2 may be completed.

Based on the flow illustrated with FIG. 2, it can be seen that, in the present disclosure, the network access device may record the user fingerprint information of the terminal in advance. It is not necessary to install on the DHCP server the DHCP agent plug-in, which is configured to transmit the user fingerprint information of the terminal to the portal server. Instead, when receiving the redirected access of the terminal to the portal server, the portal server may request the user fingerprint information of the terminal from the network access device, by using a protocol packet complying with the portal protocol, such as the REQ-INFO packet.

Furthermore, in the present disclosure, the portal server may embed the virus scan identifier on the authentication page pushed. When the terminal is safe, the terminal may be authenticated, so that the terminal may access the network when guaranteeing that the terminal is safe.

Furthermore, in the present disclosure, whether the terminal access crosses the border may be distinguished. When the terminal access crosses the border, the cross-border access prompt may be provided for the terminal, or the prompt that the terminal will join an isolated area may be provided for the terminal, so that the network security may be improved.

Figure 3:
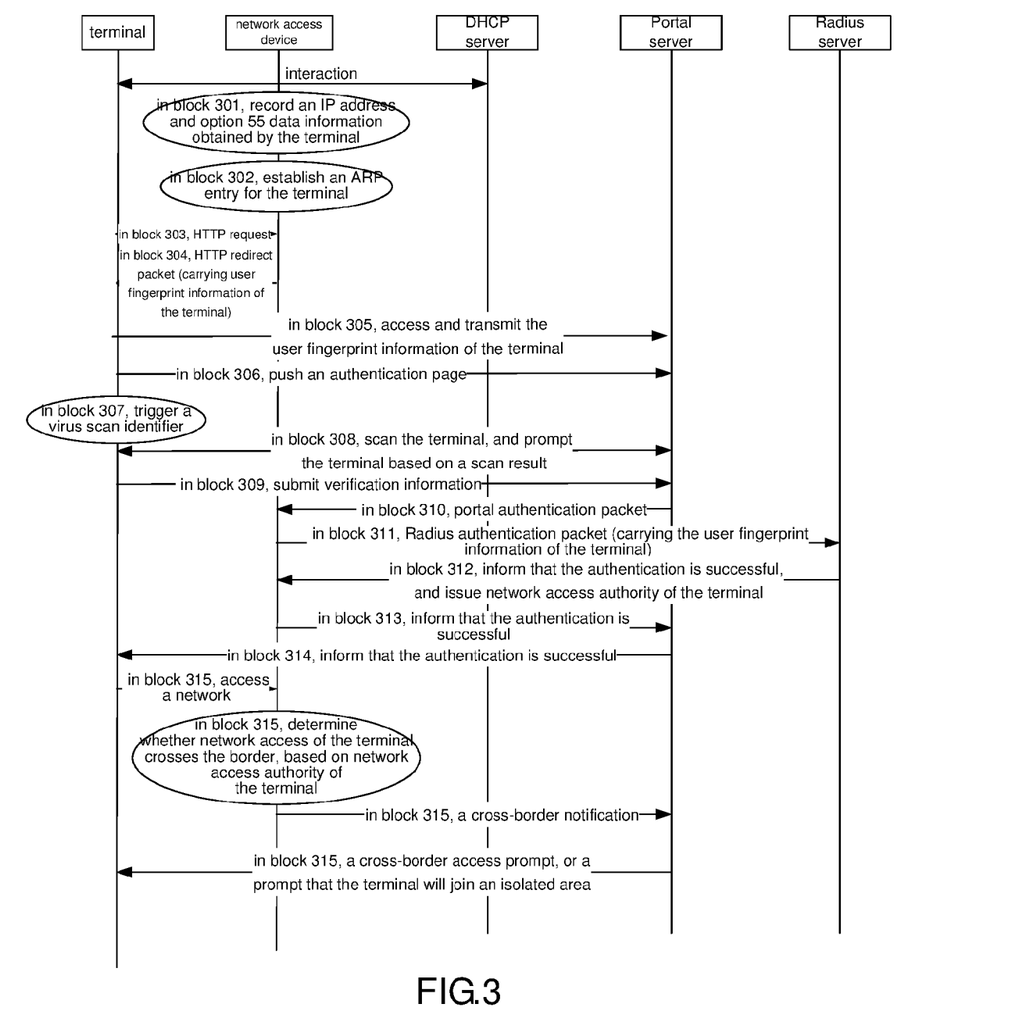
FIG. 3 is a flowchart illustrating a method, in accordance with an example of the present disclosure.

With reference to FIG. 3, FIG. 3 is a flowchart illustrating a method, in accordance with an example of the present disclosure. In the flow shown in FIG. 3, the user fingerprint information of the terminal may include the MAC address and Option 55 data information of the terminal.

As shown in FIG. 3, the flow may include the following blocks.

Blocks 301 to 303 may be similar to blocks 201 to 203 in the foregoing example.

In block 304, a network access device may receive an HTTP request from a terminal, and return to the terminal an HTTP redirect packet carrying a URL and user fingerprint information of the terminal.

Here, the URL carried by the HTTP redirect packet may be the website of the portal server.

In block 305, the terminal may access the portal server, based on the URL carried by the received HTTP redirect packet, and transmit the user fingerprint information of the terminal carried by the HTTP redirect packet to the portal server.

In block 306, the portal server may push to the terminal an authentication page corresponding to the user fingerprint information of the terminal. In the process, the user fingerprint information of the terminal may be transmitted by the terminal to the portal server in block 305. However, in the process shown in FIG. 2, the user fingerprint information including the MAC address and option 55 data information of the terminal is transmitted by the network access device to the portal server, after the network access device searching out the MAC address and option 55 data information of the terminal.

Blocks 307 to 315 may be similar to blocks 209 to 216 in the foregoing example, which will not be repeated here.

Until now, the flow illustrated with FIG. 3 may be completed.

The method provided by the present disclosure has been described with foregoing examples. The device provided by the present disclosure will be described in the following.

Figure 4:
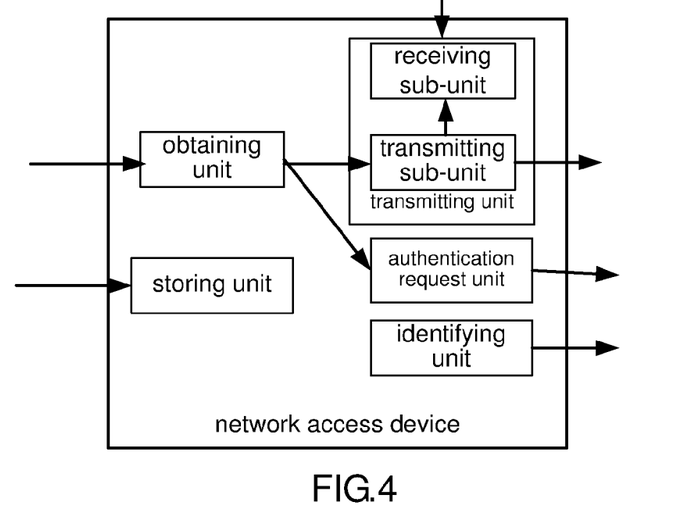
FIG. 4 is a schematic diagram illustrating a structure of a network access device, in accordance with an example of the present disclosure.

With reference to FIG. 4, FIG. 4 is a schematic diagram illustrating a structure of a network access device, in accordance with an example of the present disclosure. As shown in FIG. 4, the network access device may include an obtaining unit, and a transmitting unit.

The obtaining unit is to record user fingerprint information of a terminal.

The transmitting unit is to transmit the user fingerprint information of the terminal to a portal server, before the terminal is authenticated, so that the portal server may push to the terminal an authentication page corresponding to the user fingerprint information of the terminal.

In the present disclosure, the user fingerprint information of the terminal may include at least the MAC address and Option 55 data information of the terminal.

The obtaining unit may obtain the user fingerprint information of the terminal by using the following blocks.

The obtaining unit may record a terminal identifier and Option 55 data information of the terminal, during the interaction process between the terminal and a DHCP server.

The obtaining unit may learn the MAC address of the terminal, and establish an ARP entry for the terminal. The ARP entry may include at least the terminal identifier and the MAC address of the terminal.

In the present disclosure, before the terminal is authenticated, the transmitting unit may transmit the user fingerprint information of the terminal to the portal server, by using the following two structure modes.

A structure mode may be as follows.

The transmitting unit may include a receiving sub-unit and a transmitting sub-unit.

The receiving sub-unit is to receive an information request packet from the portal server. The information request packet may be transmitted by the portal server, when the portal server receives the HTTP request transmitted by the terminal before the terminal is authenticated.

The transmitting sub-unit is to search for the user fingerprint information of the terminal, based on the terminal identifier carried by the information request packet, and transmit the searched user fingerprint information of the terminal to the portal server by using an information response packet.

Another structure mode may be as follows.

The transmitting unit may include a receiving sub-unit and a transmitting sub-unit.

The receiving sub-unit is to receive the HTTP request initiated by the terminal, before the terminal is authenticated.

The transmitting sub-unit is to enable the redirect packet to carry the user fingerprint information of the terminal and the website of the portal server, and return the redirect packet to the terminal, so that when the terminal accesses the website of the portal server carried by the redirect packet, the user fingerprint information of the terminal may be transmitted to the portal server.

In the present disclosure, the virus scan identifier has been embedded on the authentication page.

In the present disclosure, the receiving sub-unit is further to receive the portal authentication packet transmitted by the portal server. The portal authentication packet carries the verification information on the authentication page submitted by the terminal, after the terminal triggers the virus scan identifier embedded on the authentication page, and the terminal is authenticated to be safe when antivirus scan is completed.

Based on the foregoing descriptions, as shown in FIG. 4, the network access device may further include an authentication request unit, a storing unit, and an identifying unit.

The authentication request unit is to enable a RADIUS authentication packet to carry the user fingerprint information of the terminal and the verification information carried by the portal authentication packet, and transmit the RADIUS authentication packet to a RADIUS server.

The storing unit is to receive and store the network access authority of the terminal, which is issued by the RADIUS server based on the user fingerprint information of the terminal, after the verification information passes the authentication.

When receiving the network access of the terminal, the identifying unit is to determine whether the network access of the terminal crosses the border, based on the network access authority of the terminal. When determining that the network access of the terminal crosses the border, the identifying unit may inform the portal server about a cross-border access message of the terminal, so that the portal server may provide a cross-border access prompt to the terminal, or the portal server may provide a prompt that the terminal will join an isolated area to the terminal.

In the present disclosure, the identifying unit is further to inform the RADIUS server to re-issue the network access authority corresponding to the terminal.

When receiving the network access authority corresponding to the terminal, which is re-issued by the RADIUS server, the storing unit is to remove previous stored network access authority corresponding to the terminal, and store the latest network access authority of the terminal issued by the RADIUS server.

Figure 5:
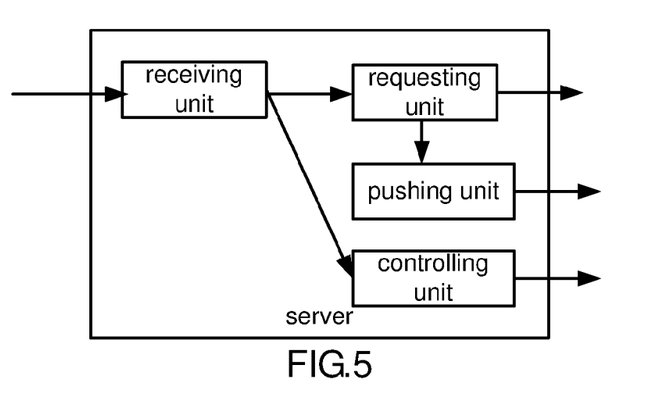
FIG. 5 is a schematic diagram illustrating a structure of a server, in accordance with an example of the present disclosure.

Until now, the descriptions about the network access device shown in FIG. 5 are completed.

With reference to FIG. 5, FIG. 5 is a schematic diagram illustrating a structure of a server, in accordance with an example of the present disclosure. The server is a portal server. As shown in FIG. 5, the server may include a receiving unit, a requesting unit, and a pushing unit.

The receiving unit is to receive an HTTP request, which is redirected to the portal server and transmitted by a terminal, before the terminal is authenticated, The requesting unit is to transmit an information request packet to a network access device, to request user fingerprint information of the terminal.

The pushing unit is to push to the terminal an authentication page corresponding to the user fingerprint information of the terminal, based on the user fingerprint information of the terminal transmitted by the network access device.

In the present disclosure, a virus scan identifier is embedded on the authentication page.

In the present disclosure, the receiving unit is further to receive the triggering of the virus scan identifier embedded on the authentication page from the terminal.

In the present disclosure, the server may further include a controlling unit.

When the receiving unit receives the triggering of the virus scan identifier, the controlling unit is to trigger antivirus software installed on the terminal to scan the terminal, and receive a scan result from the terminal after the scan is completed. When the scan result shows that the terminal is not safe, the controlling unit may prompt the terminal to kill virus. When virus killing is completed, the controlling unit may allow the terminal to input verification information to be authenticated. When the scan result shows that the terminal is safe, the controlling unit may allow the terminal to input the verification information to be authenticated.

Or, when the receiving unit receives the triggering of the virus scan identifier, the controlling unit may remotely control antivirus software installed on the portal server to scan the terminal. When determining that the terminal is not safe after scan is completed, the controlling unit may prompt the terminal to kill virus. When the virus killing is completed, the controlling unit may allow the terminal to input the verification information to be authenticated. When determining that the terminal is safe, the controlling unit may allow the terminal to input the verification information to be authenticated.

Based on the foregoing descriptions, in the present disclosure, the receiving unit is further to receive the verification information on the authentication page submitted by the terminal, when the terminal is allowed to input the verification information.

The pushing unit is further to encapsulate the verification information with the portal protocol into a portal authentication packet, and transmit the portal authentication packet to the network access device, so that the network access device may transmit the verification information to a RADIUS server to be authenticated.

Figure 6:
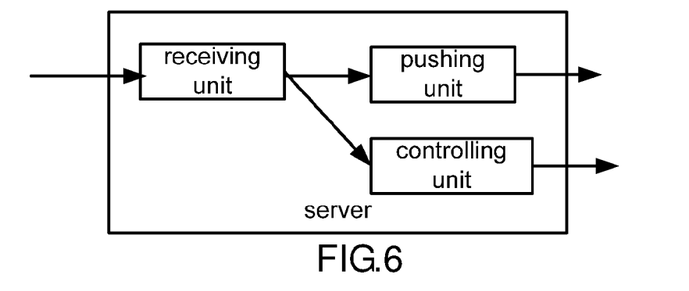
FIG. 6 is a schematic diagram illustrating another structure of a server, in accordance with an example of the present disclosure.

Until now, descriptions about the server structure shown in FIG. 6 are completed.

As an example of the present disclosure, the present disclosure also provides another server structure.

With reference to FIG. 6, FIG. 6 is a schematic diagram illustrating another structure of a server, in accordance with an example of the present disclosure. As shown in FIG. 6, the server may include a receiving unit and a pushing unit.

The receiving unit is to receive user fingerprint information of a terminal transmitted by the terminal before the terminal is authenticated, when the terminal accesses a portal server.

The pushing unit is to push to the terminal an authentication page corresponding to the user fingerprint information of the terminal.

In the present disclosure, a virus scan identifier is embedded on the authentication page.

The receiving unit is further to receive triggering of the virus scan identifier embedded on the authentication page from the terminal.

The server may further include a controlling unit.

When the receiving unit receives the triggering of the virus scan identifier, the controlling unit may trigger antivirus software installed on the terminal to scan the terminal, and receive a scan result from the terminal, when the scan is completed. When the scan result shows that the terminal is not safe, the controlling unit may prompt the terminal to kill virus. When the virus killing is completed, the controlling unit may allow the terminal to input verification information to be authenticated. When the scan result shows that the terminal is safe, the controlling unit may allow the terminal to input the verification information to be authenticated.

Or, when the receiving unit receives the triggering of the virus scan identifier, the controlling unit may remotely control the antivirus software installed on the portal server to scan the terminal. When determining that the terminal is not safe after the scan is completed, the controlling unit may prompt the terminal to kill virus. When the virus killing is completed, the controlling unit may allow the terminal to input the verification information to be authenticated. When determining that the terminal is safe, the controlling unit may allow the terminal to input the verification information to be authenticated.

Based on the foregoing descriptions, the receiving unit is further to receive the verification information on the authentication page submitted by the terminal, when the terminal is allowed to input the verification information.

The pushing unit is further to encapsulate the verification information into a portal authentication packet with the portal protocol, and transmit the portal authentication packet to the network access device, so that the network access device may transmit the verification information to a RADIUS server to be authenticated.

Figure 7:
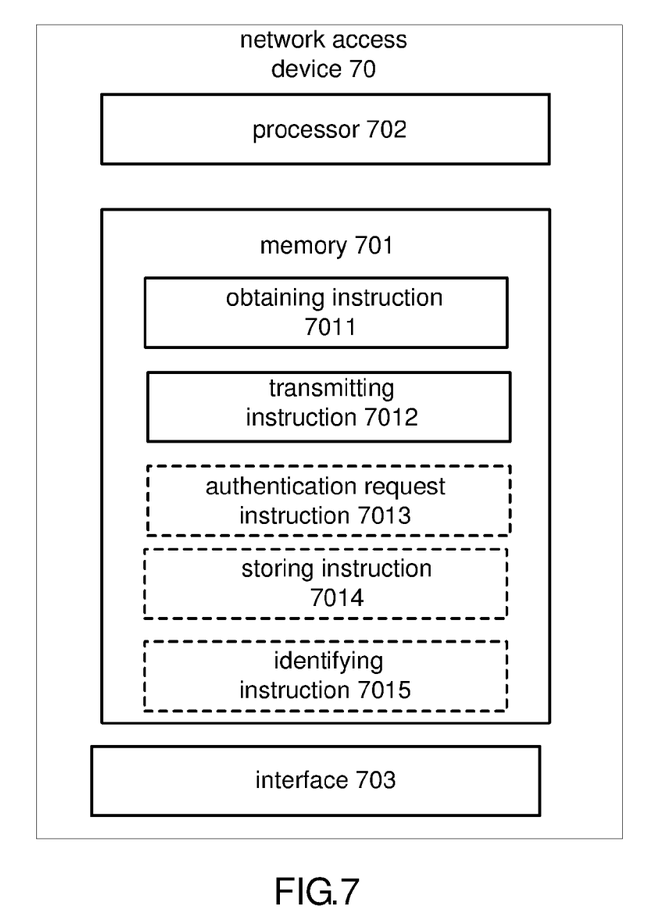
FIG. 7 is a schematic diagram illustrating another structure of a network access device, in accordance with an example of the present disclosure.

Until now, descriptions about another server structure shown in FIG. 7 are completed.

With reference to FIG. 7, FIG. 7 is a schematic diagram illustrating a structure of a network access device, in accordance with an example of the present disclosure. As shown in FIG. 7, the network access device 70 may include a memory 701, a processor 702 in communication with the memory 701, and an interface 703. The memory 701 is to store an obtaining instruction 7011 and a transmitting instruction 7012, which are executable by the processor 702.

The obtaining instruction 7011 indicates to record user fingerprint information of a terminal.

The transmitting instruction 7012 indicates to transmit the user fingerprint information of the terminal to a portal server through the interface 703, before the terminal is authenticated, so that the portal server may push to the terminal an authentication page corresponding to the user fingerprint information of the terminal.

In the present disclosure, the user fingerprint information of the terminal may include at least the MAC address and Option 55 data information of the terminal.

The obtaining instruction 7011 indicates to obtain the user fingerprint information of the terminal with the following blocks:

record a terminal identifier and Option 55 data information of the terminal, during the interaction process between the terminal and a DHCP server;

learn the MAC address of the terminal, and establish an ARP entry for the terminal. The ARP entry may include at least the terminal identifier and MAC address of the terminal.

In the present disclosure, the transmitting instruction 7012 indicates to transmit the user fingerprint information of the terminal to the portal server with the following two structure modes, before the terminal is authenticated.

A structure mode may be as follows.

The transmitting instruction 7012 may include a receiving sub-instruction 80121 and the first transmitting sub-instruction 70122 (not shown in the figure).

The receiving sub-instruction 70121 indicates to receive an information request packet from the portal server through the interface 703. The information request packet is transmitted by the portal server, when the portal server receives an HTTP request transmitted by the terminal, before the terminal is authenticated.

The transmitting sub-instruction 70122 indicates to search for the user fingerprint information of the terminal, based on the terminal identifier carried by the information request packet, and transmit the searched user fingerprint information of the terminal to the portal server with an information response packet.

Another structure mode may be as follows.

The transmitting instruction 7012 may include a receiving sub-instruction 80121 and a transmitting sub-instruction 70122 (not shown in the figure).

The receiving sub-instruction 70121 indicates to receive the HTTP request initiated by the terminal through the interface 703, before the terminal is authenticated.

The transmitting sub-instruction 70122 indicates to enable a redirect packet to carry the user fingerprint information of the terminal and website of the portal server, and return the redirect packet to the terminal through the interface 703, so that the terminal may transmit the user fingerprint information of the terminal to the portal server, when the terminal accesses the website of the portal server carried in the redirect packet.

In the present disclosure, a virus scan identifier is embedded on the authentication page.

In the present disclosure, the receiving sub-instruction 70121 further indicates to receive a portal authentication packet transmitted by the portal server through the interface 703. The portal authentication packet may carry the verification information on the authentication page submitted by the terminal, after the terminal triggers the virus scan identifier embedded on the authentication page and is authenticated to be safe, when the antivirus scan is completed.

Based on the foregoing descriptions, as shown in FIG. 7, the memory 701 further stores an authentication request instruction 7013, a storing instruction 7014, and an identifying instruction 7015, which are executable by the processor 702.

The authentication request instruction 7013 indicates to enable a RADIUS authentication packet to carry the user fingerprint information of the terminal and the verification information carried by the portal authentication packet, and transmit the RADIUS authentication packet to a RADIUS server.

The storing instruction 7014 indicates to receive and store network access authority of the terminal, which is issued by the RADIUS server based on the user fingerprint information of the terminal, after the verification information passes the authentication.

When receiving the network access of the terminal, the identifying instruction 8015 indicates to determine whether the network access of the terminal crosses the border, based on the network access authority of the terminal. When determining that the network access of the terminal crosses the border, the identifying instruction 8015 may indicate to inform the portal server about a cross-border access message of the terminal, so that the portal server may provide a cross-border access prompt to the terminal, or the portal server may provide a prompt that the terminal will join an isolated area to the terminal.

In the present disclosure, the identifying instruction 7015 further indicates to inform the RADIUS server to re-issue the network access authority corresponding to the terminal.

When receiving the network access authority corresponding to the terminal, which is re-issued by the RADIUS server, the storing instruction 7014 further indicates to remove previously stored network access authority of the terminal, and store the latest network access authority of the terminal issued by the RADIUS server.

Until now, descriptions about the network access device illustrated with FIG. 7 are completed.

Figure 8:
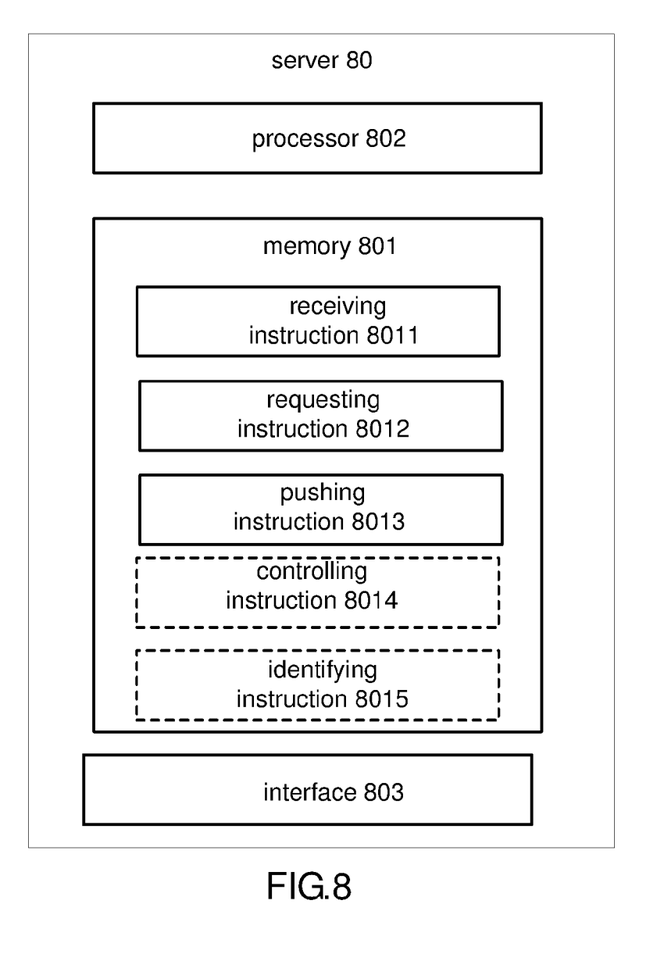
FIG. 8 is a schematic diagram illustrating still another structure of a server, in accordance with an example of the present disclosure.

With reference to FIG. 8, FIG. 8 is a schematic diagram illustrating a structure of a server 80, in accordance with an example of the present disclosure. The server is a portal server. As shown in FIG. 8, the server may include a memory 801, a processor 802 in communication with the memory 801, and an interface 803. The memory 801 is to store a receiving instruction 8011, a request instruction 8012 and a pushing instruction 8013, which are executable by the processor 802.

The receiving instruction 8011 indicates to receive an HTTP request through the interface 803, which is redirected to the portal server and is transmitted by the terminal, before the terminal is authenticated.

The request instruction 8012 indicates to transmit an information request packet to a network access device through the interface 803, so as to request user fingerprint information of the terminal.

The pushing instruction 8013 indicates to push to the terminal an authentication page corresponding to the user fingerprint information of the terminal, based on the user fingerprint information of the terminal transmitted by the network access device.

In the present disclosure, a virus scan identifier is embedded on the authentication page.

In the present disclosure, the receiving instruction 8011 further indicates to receive triggering of the virus scan identifier embedded on the authentication page from the terminal through the interface 803.

In the present disclosure, the memory 801 is further to store a controlling instruction 8014 executable by the processor 802.

When receiving the triggering of the virus scan identifier based on the receiving instruction 8011, the controlling instruction 8014 indicates to trigger antivirus software installed on the terminal to scan the terminal, and receive a scan result transmitted by the terminal, when the scan is completed. When the scan result shows that the terminal is not safe, the controlling instruction 8014 may prompt the terminal to kill virus. When the virus killing is completed, the controlling instruction 8014 may allow the terminal to input verification information to be authenticated. When the scan result shows that the terminal is safe, the controlling instruction 8014 may allow the terminal to input the verification information to be authenticated.

Or, when receiving the triggering of the virus scan identifier based on the receiving instruction 8011, the controlling instruction 8014 may remotely control the antivirus software installed on the portal server to scan the terminal. When determining that the terminal is not safe, after the scan is completed, the controlling instruction 8014 may prompt the terminal to kill virus. When the virus killing is completed, the controlling instruction 8014 may allow the terminal to input the verification information to be authenticated. When determining that the terminal is safe, the controlling instruction 8014 may allow the terminal to input the verification information to be authenticated.

Based on the foregoing descriptions, in the present disclosure, the receiving instruction 8011 further indicates to receive the verification information on the authentication page submitted by the terminal, when the terminal is allowed to input the verification information.

The pushing instruction 8013 further indicates to encapsulate the verification information into a portal authentication packet with the portal protocol, and transmit the portal authentication packet to a network access device, so that the network access device may transmit the verification information to a RADIUS server to be authenticated.

Until now, descriptions about server structure shown in FIG. 8 are completed.

As an example of the present disclosure, the present disclosure also provides a schematic diagram illustrating another structure of a server.

Figure 9:
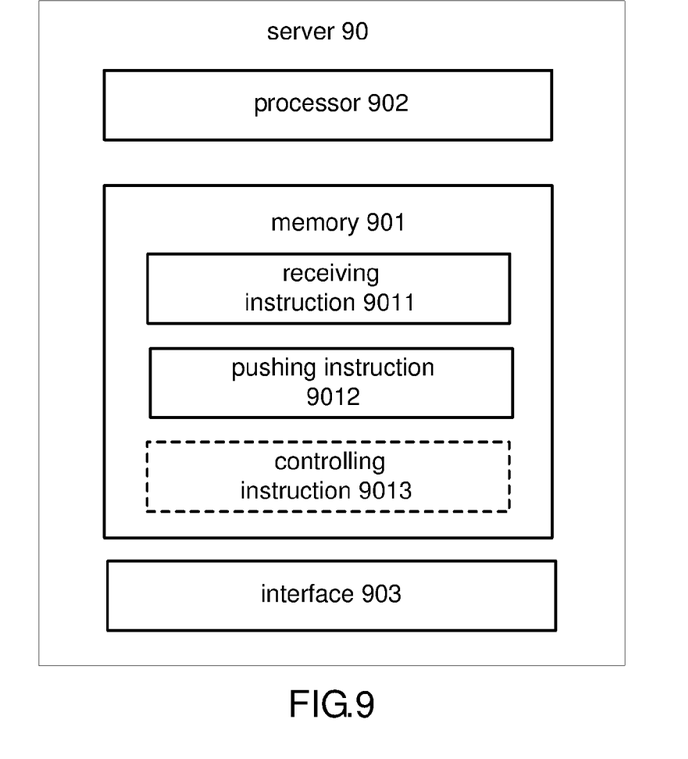
FIG. 9 is a schematic diagram illustrating still another structure of a server, in accordance with an example of the present disclosure.

With reference to FIG. 9, FIG. 9 is a schematic diagram illustrating another structure of a server 90, in accordance with an example of the present disclosure. As shown in FIG. 9, the server may include a memory 901, a processor 902 in communication with the memory 901, and an interface 903. The memory 901 may store a receiving instruction 9011 and a pushing instruction 9012, which are executable by the processor 1002.

The receiving instruction 9011 indicates to receive user fingerprint information of a terminal through the interface 903, which is transmitted by the terminal when accessing a portal server, before the terminal is authenticated.

The pushing instruction 9012 indicates to push to the terminal an authentication page corresponding to the user fingerprint information of the terminal through the interface 903.

In the present disclosure, a virus scan identifier is embedded on the authentication page.

The receiving instruction 9011 further indicates to receive triggering of the virus scan identifier embedded on the authentication page from the terminal through the interface 1003.

The memory 901 further stores a controlling instruction 9013 executable by the processor 902.

When receiving the triggering of the virus scan identifier through the interface 903 based on the receiving instruction 9011, the controlling instruction 9013 indicates to trigger the antivirus software installed on the terminal to scan the terminal, and receive a scan result transmitted by the terminal, when the scan is completed. When the scan result shows that the terminal is not safe, the controlling instruction 9013 may indicate to prompt the terminal to kill virus. When the virus killing is completed, the controlling instruction 9013 may indicate to allow the terminal to input the verification information to be authenticated. When the scan result shows that the terminal is safe, the controlling instruction 9013 may indicate to allow the terminal to input the verification information to be authenticated.

Or, when receiving the triggering of the virus scan identifier through the interface 903 based on the receiving instruction 9011, the controlling instruction 9013 indicates to remotely control the antivirus software installed on the portal server to scan the terminal. When determining that the terminal is not safe after the scan is completed, the controlling instruction 9013 may indicate to prompt the terminal to kill virus. When the virus killing is completed, the controlling instruction 9013 may indicate to allow the terminal to input the verification information to be authenticated. When determining that the terminal is safe, the controlling instruction 9013 may indicate to allow the terminal to input the verification information to be authenticated.

Based on the foregoing descriptions, the receiving instruction 9011 further indicates to receive the verification information on the authentication page submitted by the terminal through the interface 903, when the terminal is allowed to input the verification information.

The pushing instruction 9012 further indicates to encapsulate the verification information into a portal authentication packet with the portal protocol, and transmit the portal authentication packet to a network access device through the interface 903, so that the network access device may transmit the verification information to a RADIUS server to be authenticated.

Until now, descriptions about another server structure shown in FIG. 9 are completed.

Based on the foregoing technical solutions, it can be seen that, in the present disclosure, the network access device may obtain the user fingerprint information of the terminal in advance. It is not necessary to install on the DHCP server the DHCP agent plug-in, which is to transmit the user fingerprint information of the terminal to the portal server. Instead, before the terminal is authenticated, the network access device may transmit the user fingerprint information of the terminal to the portal server, so that the portal server may push to the terminal the authentication page corresponding to the user fingerprint information of the terminal. Subsequently, it may avoid installing on the DHCP server the DHCP agent plug-in, which is to transmit the user fingerprint information of the terminal to the portal server. The network access device may transmit the user fingerprint information of the terminal to the portal server with a protocol packet.

The invention claimed is:

1. A terminal access method, comprising:
obtaining, by a network access device, terminal identification information of a terminal;
transmitting, by the network access device, the terminal identification information of the terminal to a portal server, before the terminal is authenticated, such that the portal server pushes to the terminal an authentication page corresponding to the terminal identification information of the terminal, wherein:
the portal server pushes an authentication page corresponding to an enterprise terminal in response to the terminal identification information indicating the terminal is a terminal of an employee; and
the portal server pushes an authentication page corresponding to a visitor terminal in response to the terminal identification information indicating the terminal is a terminal of a visitor;
triggering, by the network access device, antivirus software installed on the terminal to cause the portal server to scan the terminal;
in response to the antivirus software locating a virus, prompting the terminal to kill the virus;
based on the terminal killing the virus, causing the terminal to input the verification information to be authenticated; and
in response to successful authentication of the verification information, granting network access to the terminal.

2. The method according to claim 1, wherein the terminal identification information of the terminal comprises at least a media access control (MAC) address and option 55 data information of the terminal.

3. The method according to claim 1, wherein transmitting by the network access device the terminal identification information of the terminal to the portal server, before the terminal is authenticated, comprises:
receiving, by the network access device, an information request packet from the portal server; and
searching for, by the network access device, the terminal identification information of the terminal based on the terminal identifier carried by the information request packet; and
transmitting the searched terminal identification information of the terminal to the portal server with an information response packet.

4. The method according to claim 3, wherein the information request packet is a packet complying with a portal protocol configured to search for user physical information of the terminal, wherein the information request packet is a request-information (REQ-INFO) packet.

5. The method according to claim 1, wherein transmitting, by the network access device, the terminal identification information of the terminal to the portal server before the terminal is authenticated comprises:
receiving, by the network access device, the HTTP request initiated by the terminal before the terminal is authenticated; and
returning, by the network access device, a redirect packet carrying the terminal identification information of the terminal and website of the portal server to the terminal such that the terminal transmits the terminal identification information of the terminal to the portal server when the terminal accesses the website of the portal server carried in the redirect packet.

6. The method according to claim 1, wherein the virus scan identifier is embedded on the authentication page, and the method further comprises:
receiving, by the network access device, a portal authentication packet transmitted by the portal server after the terminal triggers the virus scan identifier embedded on the authentication page, wherein the portal authentication packet carries verification information on the authentication page submitted by the terminal, and wherein the terminal is determined to be safe when an antivirus scan is completed.

7. The method according to claim 6, wherein the method further comprises informing, by the network access device, the portal server of a level of network access of the terminal by:
informing, by the network access device, the RADIUS server to re-issue the network access authority corresponding to the terminal;
removing, by the network access device, a network access authority of the terminal previously stored when receiving the network access authority corresponding to the terminal re-issued by the RADIUS server; and
storing the latest network access authority of the terminal issued by the RADIUS server.

8. The method according to claim 2, wherein obtaining by the network access device the terminal identification information of the terminal comprises:
recording, by the network access device, a terminal identifier and the option 55 data information of the terminal during an interaction process between the terminal and a dynamic host configuration protocol (DHCP) server; and
learning, by the network access device, the MAC address of the terminal; and
establishing an address resolution protocol (ARP) entry for the terminal, wherein the ARP entry comprises at least the terminal identifier and the MAC address of the terminal.

9. The method according to claim 4, wherein the information response packet is a packet complying with the portal protocol which responds to the packet searching for the user physical information of the terminal, the information response packet further carries the user physical information of the terminal; and
when the information request packet is the REQ-INFO packet, the information response packet is an acknowledgement-information (ACK-INFO) packet.

10. The method according to claim 6, wherein the method further comprises:
enabling, by the network access device, a RADIUS authentication packet to carry the terminal identification information of the terminal and the verification information carried by the portal authentication packet;
transmitting the RADIUS authentication packet to the RADIUS server; and
receiving and storing, by the network access device, a network access authority of the terminal issued by the RADIUS server based on the terminal identification information of the terminal after authentication of the verification information is passed.

11. A network access device, comprising a memory, a processor in communication with the memory, and an interface, wherein the memory includes machine readable instructions which are executable by the processor to:
record terminal identification information of a terminal;
transmit the terminal identification information of the terminal to a portal server through the interface, before the terminal is authenticated, such that the portal server pushes to the terminal an authentication page corresponding to the terminal identification information of the terminal, wherein:
the portal server pushes an authentication page corresponding to an enterprise terminal in response to the terminal identification information indicating the terminal is a terminal of an employee; and
the portal server pushes an authentication page corresponding to a visitor terminal in response to the terminal identification information indicating the terminal is a terminal of a visitor;
trigger antivirus software installed on the terminal to cause the portal server to scan the terminal;
in response to the antivirus software locating a virus, prompt the terminal to kill the virus;
based on the terminal killing the virus, cause the terminal to input the verification information to be authenticated; and
in response to successful authentication of the verification information, grant network access to the terminal.

12. The network access device according to claim 11, wherein the terminal identification information of the terminal comprises at least a media access control (MAC) address and option 55 data information of the terminal; and
the machine readable instructions are executable by the processor to record a terminal identifier and the option 55 data information of the terminal during an interaction process between the terminal and a Dynamic Host Configuration Protocol (DHCP) server.

13. The network access device according to claim 11, wherein the machine readable instructions are executable by the processor to;
receive an information request packet from a portal server through the interface; and
search for the terminal identification information of the terminal, based on the terminal identifier carried by the information request packet; and
transmit the searched terminal identification information of the terminal to the portal server with an information response packet.

14. The network access device according to claim 11, wherein the machine readable instructions are executable by the processor to:
receive a hypertext transfer protocol (HTTP) request initiated by the terminal through the interface before the terminal is authenticated;
enable a redirect packet to carry the terminal identification information of the terminal and website of the portal server; and return the redirect packet to the terminal through the interface such that the terminal transmits the terminal identification information of the terminal to the portal server when the terminal accesses the website of the portal server carried in the redirect packet.

15. The network access device according to claim 13, wherein the virus scan identifier is embedded on the authentication page; and
wherein the machine readable instructions are executable by the processor to:
receive a portal authentication packet from the portal server through the interface, wherein the portal authentication packet carries verification information on the authentication page submitted by the terminal after the terminal triggers the virus scan identifier embedded on the authentication page and the terminal is determined to be safe when antivirus scan is completed;
enable a RADIUS authentication packet to carry the terminal identification information of the terminal and the verification information carried by the portal authentication packet;
transmit the RADIUS authentication packet to a RADIUS server through the interface;
store a network access authority of the terminal through the interface, which is issued by the RADIUS server based on the terminal identification information of the terminal after authentication of the verification information is passed; and
determine, in response to receiving network access of the terminal through the interface, a level of network access of the terminal based on the network access authority of the terminal;
wherein the identifying instruction further indicates to inform the portal server about the level of network access such that either the portal server provides an access level prompt to the terminal, or the portal server provides a prompt to the terminal that the terminal will join an isolated area for the terminal.

16. The network access device according to claim 15, wherein the identifying instruction further indicates to inform the RADIUS server to re-issue the network access authority corresponding to the terminal; and
when receiving the network access authority corresponding to the terminal, which is re-issued by the RADIUS server through the interface, the storing instruction indicates to remove the previously stored network access authority corresponding to the terminal and store the latest network access authority of the terminal which is issued by the RADIUS server.

17. The network access device according to claim 12, wherein the machine readable instructions are executable by the processor to learn the MAC address of the terminal and establish an Address Resolution Protocol (ARP) entry for the terminal, wherein the ARP entry comprises at least the terminal identifier and the MAC address of the terminal.

18. A portal server comprising a memory, a processor in communication with the memory, and an interface, wherein the memory includes machine readable instructions which are executable by the processor to:
receive terminal identification information of a terminal through the interface, which is transmitted by the terminal when the terminal accesses the portal server, before the terminal is authenticated;
push, through the interface to the terminal, an authentication page corresponding to the terminal identification information of the terminal, wherein:
the pushed authentication page corresponds to an enterprise terminal in response to the terminal identification information indicating the terminal is a terminal of an employee; and
the pushed authentication page corresponds to a visitor terminal in response to the terminal identification information indicating the terminal is a terminal of a visitor;
trigger antivirus software installed on the terminal to cause the portal server to scan the terminal;
in response to the antivirus software locating a virus, prompt the terminal to kill the virus;
based on the terminal killing the virus, cause the terminal to input the verification information to be authenticated; and
in response to successful authentication of the verification information, grant network access to the terminal.

19. The server according to claim 18, wherein the virus scan identifier is embedded on the authentication page, and the receiving instruction further indicates to receive a triggering of the virus scan identifier embedded on the authentication page from the terminal through the interface;
wherein the machine readable instructions, in response to receiving the triggering of the virus scan identifier, are executable by the processor to:
remotely control antivirus software installed on the portal server to scan the terminal when determining that the terminal is not safe after the scan is finished; and
in response to the antivirus software locating a virus, prompt the terminal to kill the virus and allow the terminal to input the verification information to be authenticated.

20. The server according to claim 19, wherein the machine readable instructions, in response to receiving the triggering of the virus scan identifier, are executable by the processor to:
allow the terminal to input the verification information to be authenticated based on the terminal killing the virus;
receive the verification information on the authentication page through the interface submitted by the terminal;
encapsulate the verification information into a portal authentication packet with a portal protocol; and
transmit the portal authentication packet to a network access device through the interface such that the network access device transmits the verification information to a RADIUS server to be authenticated.

* * * * *